UNITED STATES PATENT OFFICE.

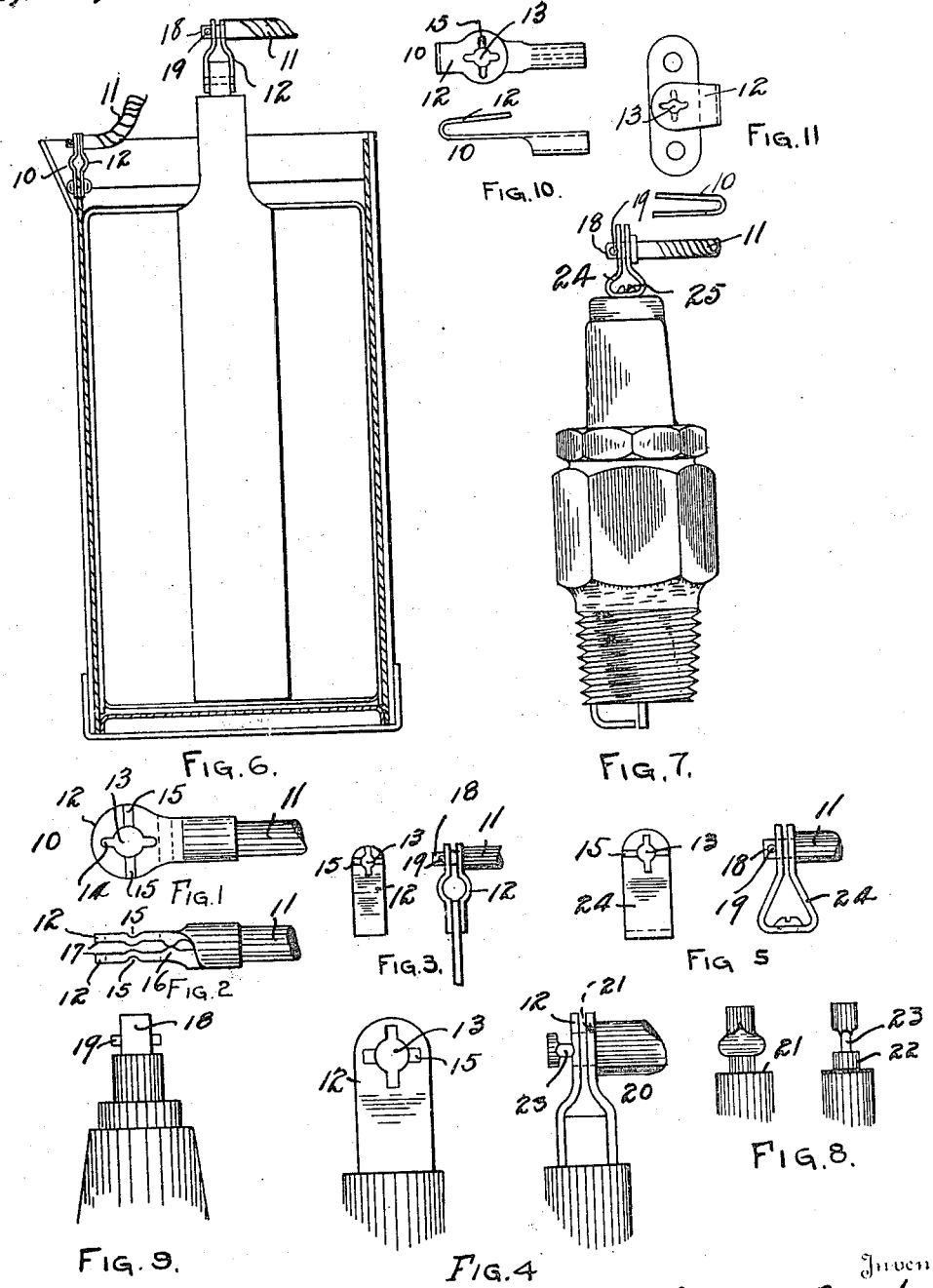

CHARLES H. BECK, OF ALTOONA, PENNSYLVANIA.

BATTERY CONNECTION.

1,143,485.

Specification of Letters Patent. Patented June 15, 1915.

Application filed August 31, 1914. Serial No. 859,519.

*To all whom it may concern:*

Be it known that I, CHARLES H. BECK, a citizen of the United States, residing at Altoona, in the county of Blair and State of Pennsylvania, have invented certain new and useful Improvements in Battery Connections, of which the following is a specification.

This invention relates to battery and spark plug connections used in the operation of internal combustion engines, and has for its primary object improved means for attaching wire terminals to the battery, or to the spark plug, of gas or gasolene engines.

Another object of this device is to provide a wire terminal which effectively coöperates with a battery attachment, in such manner that the usual threaded stem and knurled nuts are dispensed with, and to this end the present invention contemplates a wire terminal attachment which is adapted to be effectively locked to the battery post, in such manner that it is necessary to turn the terminal through a selected number of degrees before the terminal can be disengaged from the battery, thus reducing, in a very practical manner, one of the main causes of faulty ignition in internal combustion engines.

Another object of the device is to provide an improved battery connection which not only possesses means for being rigidly attached to the battery, but also admits the attachment of the wire terminal at the same time, in such manner that loose battery connections will be effectively eliminated.

With these and many other objects in view, which will be more readily apparent as the nature of the invention is better understood, the same consists of the novel combination, construction, and arrangement of parts, as will be hereinafter fully pointed out, illustrated and claimed.

The essential features of the invention, in carrying out the above objects indicated, are necessarily susceptible to structural modifications without departing from the spirit or scope of the invention, but a preferred and practical embodiment thereof is shown in the accompanying drawings, in which:

Figure 1, shows a plan view of a wire terminal with the present invention attached thereto. Fig. 2 shows a side elevation of the parts shown in Fig. 1. Fig. 3 shows side and edge views of the battery connection which is adapted to receive a modified form of terminal connection. Fig. 4 shows side and edge views of battery connections adapted to be used with the carbon pole of a dry cell. Fig. 5 shows side and edge views of a modified form of connection adapted to be used in attaching wire terminals to spark plugs. Fig. 6 shows a cross section of a dry cell and clearly illustrates the method of attaching the wire terminals to both the zinc and carbon poles of the cell. Fig. 7 shows the method of attaching the wire terminal to an internal combustion engine spark plug. Fig. 8 shows a modified form of wire terminal which is adapted to be made in a die. Fig. 9 shows a form of spark plug terminal which is adapted to be used in connection with the wire terminal shown in Figs. 1 and 2 of the drawings. Fig. 10 embodies top plan and edge views of one form of the present battery connection. Fig. 11 embodies top plan and edge views of another form of the invention.

Like reference numerals designate corresponding parts throughout the drawings.

In carrying out this invention no natural change is contemplated either in the dry cell or the spark plug, and to this end the invention contemplates a wire terminal designated by the numeral 10, having a rigid attachment to the battery wire 11, together with spaced jaws 12, each of which has a central opening 13, interrupted and pierced by a longitudinal slot 14. Positioned at right angles to this slot 14, is a depression 15, the object of which will be described later.

In order that the jaws 12 may have the required resiliency there is provided a plurality of impinging knobs or humps 16, which serve to position the ends 17, of the jaws 12, such that the post engagement which will be described later, is readily effected.

The spark plug post shown in Fig. 9 of the drawings, illustrates the type of post adapted to be used in connection with the terminal 10. If we assume that the terminal 10 is placed over post 18, allowing the post to protrude through the opening while the locking pin 19 engages the longitudinal slots 14, after which the terminal is rotated 90 degrees, or until the locking pin 19 engages the depression 15, the terminal will be effectively locked to the plug.

In the zinc terminal, shown in Fig. 3 of the drawings, the same idea is carried out with the exception of the ommission of the hump 16 which is not necessary with the construction.

Fig. 4 shows a pole connection for the carbon pole of a dry cell and further shows the modified form of wire terminal engaged with the battery terminal. In the construction of this terminal, designated by the numeral 20, I preferably form this in a die, which enables me to form the battery terminal shoulder 21, the neck 22, and the locking wings 23, at one blow, thus naturally reducing the cost thereof, as well as producing an integral terminal.

In the spark plug terminal shown in Fig. 7, I form the resilient plug terminal 24, preferably of brass, having provision for the wire terminal as shown in side view of Fig. 5. This plug terminal is adapted to be secured to the spark plug through the medium of a screw 25.

With further reference to the general features of the invention, it will be observed that the clip member 10 has each of its jaws 12 provided with a keyhole slot 13 and the radially disposed keeper grooves 15, and in each instance the jaws of the clip member are resiliently held apart. That is to say, they are compressible to enable them to be easily and quickly fitted to the terminal element, and when released spring apart to grip the locking projections of the terminal element, whether it is fixed as in the case of a spark plug, or fitted to the end of a wire.

From the foregoing it is believed that the many features and advantages of the invention will be readily apparent without further description, and that minor details of the same may be changed to adapt the invention to special circumstances and service conditions, without departing from the spirit thereof, or from the scope of the appended claims.

I claim:

1. In an electrical terminal connection the combination with a terminal element having oppositely projecting locking pins, of a terminal clip member comprising a pair of oppositely arranged spring jaws having a keyhole slot adapted to receive the end of the terminal element, and be locked therewith.

2. In an electrical terminal connection the combination with a terminal element having oppositely projecting radially disposed locking pins, of a terminal clip member comprising oppositely arranged spring jaws having a keyhole slot adapted to receive the end of the terminal element, and also having radially disposed keeper grooves for receiving the locking pins of the terminal element.

3. In an electrical terminal connection the combination with a terminal element of a clip member comprising oppositely arranged resilient jaws having registering keyhole slots for receiving the terminal element, said clip adapted to be held in locking engagement with the terminal element by rotation in a quarter circle.

4. In an electrical terminal connection the combination with a terminal element of a clip member comprising oppositely arranged resilient jaws having their flat faces arranged substantially parallel, said jaws provided with registering keyhole slots and radially disposed keeper grooves on their outer faces.

5. In an electrical terminal connection the combination with a terminal element having locking pins, of a clip member comprising oppositely arranged compressible jaws having registering keyhole slots, and also having keeper grooves arranged at right angles to the longitudinal center of said slot adapted to engage with said locking pins of the terminal element.

6. An electrical terminal connection comprising a terminal element having a post portion and oppositely projecting radially disposed locking elements, and a clip member comprising compressible jaws having registering keyhole slots and a plurality of locking grooves, said clip jaws adapted to be compressed and fitted to the terminal element, then turned in a quarter circle and released into locking engagement with the locking elements of the terminal element.

7. In combination with a terminal element, a detachable terminal connection comprising a clip member having spaced jaws provided with central openings adapted to receive a portion of the terminal element, keeper grooves arranged on the outer faces of said jaws, and impinging knobs adapted to contact with each other to render the ends of the jaws resilient.

8. In combination with a terminal element, a detachable terminal connection comprising a clip member having spaced jaws provided with keyhole slots for receiving the terminal element, keeper grooves arranged on the outer faces of said jaws, and means for resiliently maintaining the jaws spaced apart.

In testimony whereof I affix my signature in presence of two witnesses.

CHARLES H. BECK.

Witnesses:
B. M. BECK,
ADAM LEAKE.